(12) United States Patent
MacDonald et al.

(10) Patent No.: US 8,553,064 B2
(45) Date of Patent: Oct. 8, 2013

(54) SYSTEM AND METHOD FOR CONTROLLING VIDEO DATA TO BE RENDERED IN A VIDEO CONFERENCE ENVIRONMENT

(75) Inventors: Alan J. MacDonald, Malvern, PA (US); Chris A. Dunn, Livermore, CA (US); Brian J. Baldino, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 392 days.

(21) Appl. No.: 12/963,387

(22) Filed: Dec. 8, 2010

(65) Prior Publication Data

US 2012/0147125 A1 Jun. 14, 2012

(51) Int. Cl.
*H04N 7/14* (2006.01)

(52) U.S. Cl.
USPC .............. 348/14.07; 348/14.08; 348/14.12; 370/265; 379/202.01; 709/205; 715/201; 715/246

(58) Field of Classification Search
USPC ............. 348/14.01–14.16; 370/259–271, 370/351–357; 455/412.1–426.2, 455/550.1–560, 575.1–575.9, 90.1–90.3; 709/201–207, 217–248
See application file for complete search history.

(56) References Cited

U.S. PATENT DOCUMENTS

| | | | |
|---|---|---|---|
| 3,519,744 A | 7/1970 | Dorros et al. | |
| 3,601,530 A | 8/1971 | Edson et al. | |
| 3,718,770 A | 2/1973 | Reese | |
| 3,944,736 A | 3/1976 | Shepard | |
| 4,054,908 A | 10/1977 | Poirier et al. | |
| 4,267,593 A | 5/1981 | Regan et al. | |
| 4,400,724 A | 8/1983 | Fields | |
| 4,449,238 A | 5/1984 | Lee et al. | |
| 4,494,144 A | 1/1985 | Brown | |
| 4,531,024 A | 7/1985 | Colton et al. | |
| 4,961,211 A | 10/1990 | Tsugane et al. | |
| 4,965,819 A | 10/1990 | Kannes | |
| 5,272,526 A | 12/1993 | Yoneta et al. | |
| 5,491,797 A | 2/1996 | Thompson et al. | |
| 5,508,733 A * | 4/1996 | Kassatly | 725/93 |
| 5,541,639 A | 7/1996 | Takatsuki et al. | |
| 5,673,256 A | 9/1997 | Maine | |

(Continued)

FOREIGN PATENT DOCUMENTS

| | | |
|---|---|---|
| EP | 1690428 | 8/2006 |
| WO | WO 2005/060501 | 7/2005 |

(Continued)

OTHER PUBLICATIONS

U.S. Appl. No. 12/963,324, entitled "System and Method for Exchanging Information in a Video Conference Environment," filed Dec. 8, 2010; Inventor(s) TiongHu Liar et al.

(Continued)

*Primary Examiner* — Hemant Patel
(74) *Attorney, Agent, or Firm* — Patent Capital Group

(57) ABSTRACT

A method is provided in one example embodiment and includes establishing a video session in which a plurality of displays are used for rendering video data, and evaluating a presentation element in order to identify a control element that includes control data. The control element is included in the presentation element. The method further includes communicating at least a portion of the control data such that it can be used to determine which video data is to be rendered on the plurality of displays.

20 Claims, 4 Drawing Sheets

(56) References Cited

U.S. PATENT DOCUMENTS

| | | | |
|---|---|---|---|
| 5,675,374 A | 10/1997 | Kohda | |
| 5,737,011 A | 4/1998 | Lukacs | |
| 5,751,337 A | 5/1998 | Allen et al. | |
| 5,790,179 A | 8/1998 | Shibata et al. | |
| 5,801,756 A | 9/1998 | Iizawa | |
| 5,802,294 A * | 9/1998 | Ludwig et al. | 709/204 |
| 5,903,637 A | 5/1999 | Hogan et al. | |
| 6,049,694 A | 4/2000 | Kassatly | |
| 6,172,703 B1 | 1/2001 | Lee | |
| 6,346,962 B1 | 2/2002 | Goodridge | |
| 6,396,531 B1 | 5/2002 | Gerszberg et al. | |
| 6,577,807 B1 | 6/2003 | Yaegashi et al. | |
| 6,611,503 B1 | 8/2003 | Fitzgerald et al. | |
| 6,710,797 B1 | 3/2004 | McNelley et al. | |
| 6,711,212 B1 | 3/2004 | Lin | |
| 6,757,277 B1 | 6/2004 | Shaffer et al. | |
| 6,774,927 B1 | 8/2004 | Cohen et al. | |
| 6,775,247 B1 | 8/2004 | Shaffer et al. | |
| 6,795,108 B2 | 9/2004 | Jarboe et al. | |
| 6,798,441 B2 | 9/2004 | Hartman et al. | |
| 6,882,358 B1 | 4/2005 | Schuster et al. | |
| 6,886,036 B1 | 4/2005 | Santamaki et al. | |
| 6,922,718 B2 | 7/2005 | Chang | |
| 6,981,047 B2 | 12/2005 | Hanson et al. | |
| 6,989,836 B2 | 1/2006 | Ramsey | |
| 6,992,702 B1 | 1/2006 | Foote et al. | |
| 6,999,829 B2 | 2/2006 | Bazzocchi et al. | |
| 7,027,659 B1 | 4/2006 | Thomas | |
| 7,038,588 B2 | 5/2006 | Boone et al. | |
| 7,039,027 B2 | 5/2006 | Bridgelall | |
| 7,043,528 B2 | 5/2006 | Schmitt et al. | |
| 7,050,425 B2 | 5/2006 | Richter et al. | |
| 7,054,268 B1 | 5/2006 | Parantainen et al. | |
| 7,057,636 B1 | 6/2006 | Cohen-Solal et al. | |
| 7,068,299 B2 | 6/2006 | Lemieux et al. | |
| 7,080,105 B2 | 7/2006 | Nakanishi et al. | |
| 7,092,002 B2 | 8/2006 | Ferren et al. | |
| 7,111,045 B2 | 9/2006 | Kato et al. | |
| 7,151,758 B2 | 12/2006 | Kumaki et al. | |
| 7,154,526 B2 | 12/2006 | Foote et al. | |
| 7,203,904 B2 | 4/2007 | Lee | |
| 7,245,272 B2 | 7/2007 | Shiuan et al. | |
| 7,256,822 B2 | 8/2007 | Suga et al. | |
| 7,277,117 B2 * | 10/2007 | Takashima et al. | 348/14.09 |
| 7,515,174 B1 * | 4/2009 | Francisco et al. | 348/14.16 |
| 7,532,232 B2 | 5/2009 | Shah et al. | |
| 7,707,247 B2 * | 4/2010 | Dunn et al. | 709/204 |
| 2002/0099682 A1 | 7/2002 | Stanton | |
| 2002/0103864 A1 | 8/2002 | Rodman et al. | |
| 2003/0071890 A1 | 4/2003 | McClure | |
| 2003/0149724 A1 | 8/2003 | Chang | |
| 2004/0004942 A1 | 1/2004 | Nebiker et al. | |
| 2004/0010464 A1 | 1/2004 | Boaz | |
| 2004/0236830 A1 * | 11/2004 | Nelson et al. | 709/204 |
| 2004/0264390 A1 | 12/2004 | Suzuki | |
| 2005/0024484 A1 | 2/2005 | Leonard et al. | |
| 2005/0050154 A1 * | 3/2005 | Gossweiler et al. | 709/208 |
| 2005/0248652 A1 | 11/2005 | Firestone et al. | |
| 2005/0260976 A1 | 11/2005 | Khartabil et al. | |
| 2006/0041571 A1 | 2/2006 | Kubokawa | |
| 2006/0066717 A1 | 3/2006 | Miceli | |
| 2006/0129626 A1 | 6/2006 | Fitzpatrick | |
| 2006/0152575 A1 | 7/2006 | Amiel et al. | |
| 2006/0158509 A1 | 7/2006 | Kenoyer et al. | |
| 2006/0168302 A1 | 7/2006 | Boskovic et al. | |
| 2006/0200518 A1 | 9/2006 | Sinclair et al. | |
| 2006/0251038 A1 | 11/2006 | Tamura et al. | |
| 2006/0259193 A1 | 11/2006 | Wang et al. | |
| 2006/0264207 A1 | 11/2006 | Tamura et al. | |
| 2007/0070940 A1 | 3/2007 | Vander Veen et al. | |
| 2007/0206091 A1 | 9/2007 | Dunn | |
| 2007/0211141 A1 | 9/2007 | Christiansen | |
| 2007/0250567 A1 | 10/2007 | Graham | |
| 2008/0062625 A1 | 3/2008 | Batio | |
| 2008/0136896 A1 * | 6/2008 | Graham et al. | 348/14.08 |
| 2008/0246834 A1 | 10/2008 | Lunde et al. | |
| 2008/0266380 A1 * | 10/2008 | Gorzynski et al. | 348/14.08 |
| 2008/0267282 A1 | 10/2008 | Kalipatnapu et al. | |
| 2009/0009587 A1 * | 1/2009 | Lindbergh | 348/14.08 |
| 2009/0174764 A1 * | 7/2009 | Chadha et al. | 348/14.09 |
| 2009/0213207 A1 | 8/2009 | Shah et al. | |
| 2010/0013905 A1 | 1/2010 | Kumar et al. | |
| 2010/0149305 A1 | 6/2010 | Catchpole et al. | |
| 2010/0182394 A1 * | 7/2010 | Zhan | 348/14.01 |
| 2010/0309284 A1 | 12/2010 | Samadani et al. | |
| 2010/0315482 A1 | 12/2010 | Rosenfeld et al. | |
| 2012/0147123 A1 * | 6/2012 | Lian et al. | 348/14.03 |

FOREIGN PATENT DOCUMENTS

| | | |
|---|---|---|
| WO | WO 2005/062569 | 7/2005 |
| WO | WO 2006/044097 | 4/2006 |
| WO | WO 2006/062700 | 6/2006 |
| WO | WO 2007/123965 | 11/2007 |

OTHER PUBLICATIONS

Davis, Andrew, "Video Communications Industry Backgrounder," Wainhouse Research, 4 pages; [Retrieved and printed on Dec. 7, 2010] www.tandberg.net.

Froba, B., et al., "Rapid Hand Gesture Detection for Human Computer Interface," (Abstract Only) Computer Graphics and Imaging—2002, 1 page; http://www.actapress.com/PaperInfo.aspx?PaperID=25959.

Johanson, Brad, et al., "Multibrowsing: Moving Web Content across Multiple Displays," Proc. Ubiquitous Computing Conference (UBICOMP), 2001, 9 pages; http://www.graphics.stanford.edu/papers/multibrowsing/multibrowse_paper.html.

Lambert, Dave, "Polycom Video Communications," © 2004 Polycom, Inc., Jun. 20, 2004, 4 pages; http://www.polycom.com/global/documents/whitepapers/video_communications_h.239_people_content_polycom_patented_technology.pdf.

"LG electronics Unveils New Push-To-View Technology," Mobiledia, Feb. 14, 2005, 3 pages; http://www.mobiledia.com/news/25797.html.

Quemada, Juan, et al., "Isabel: An Application for real time Collaboration with a flexible Floor Control," Collaborative Computing: Networking, Applications and Worksharing, 2005 International Conference; 9 pages; http://ieeexplore.ieee.org/iel5/10986/34623/01651238.pdf.

"Samsung Demonstrates Push-To-All Technology," Samsung.com, Feb. 25, 2005, 1 page; http://www.samsung.com/us/news/newsPreviewRead.do?news_seq=2564.

Weinstein, Ira, et al. "Emerging Technologies for Teleconferencing and Telepresence," Wainhouse Research, 2005, 54 pages. http://www.wrplatinum.com/content.aspx?Relo=1&CID=4382.

Ylitalo, Jukka, et al., "Re-thinking Security in IP bases Micro-Mobility," 2005, 12 pages; www.tcs.hut.fi/Studies/T-79.5601/2005AUT/ISC04-Vlitalo-4-al.pdf.

USPTO Mar. 25, 2013 Notice of Allowance from U.S. Appl. No. 12/963,324.

USPTO Feb. 11, 2013 Response to Nov. 9, 2012 Non-Final Office Action from U.S. Appl. No. 12/963,324.

USPTO Nov. 9, 2012 Non-Final Office Action from U.S. Appl. No. 12/963,324.

* cited by examiner

SYSTEM AND METHOD FOR CONTROLLING VIDEO DATA TO BE RENDERED IN A VIDEO CONFERENCE ENVIRONMENT

TECHNICAL FIELD

This disclosure relates in general to the field of communications, and more particularly, to controlling video data to be rendered in a video conference environment.

BACKGROUND

Video services have become increasingly important in today's society. In certain architectures, service providers may seek to offer sophisticated videoconferencing services for their end users. The videoconferencing architecture can offer an "in-person" meeting experience over a network. Videoconferencing architectures can deliver real-time, face-to-face interactions between people using advanced visual, audio, and collaboration technologies. Some issues have arisen in meeting scenarios when presentation materials accompany a video conference. Typically, display surface area is limited such that not all video data pertinent to the meeting can be shown at all times. Hence, the ability to optimize display use during a video conference presents a significant challenge to developers and designers, who attempt to offer a videoconferencing solution that is realistic and that mimics a real-life meeting.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes establishing a video session in which a plurality of displays are used for rendering video data, and evaluating a presentation element in order to identify a control element that includes control data. The control element is included in the presentation element. The method further includes communicating at least a portion of the control data such that it can be used to determine which video data is to be rendered on the plurality of displays.

In more specific embodiments, the control data provides a switching command that relates to rendering particular image data associated with a particular end user on a particular one of the displays. The control element can provide a change in switching mode such that subsequent control elements included in the presentation element control which of the video data is to be rendered on the displays. In more particular embodiments, the control element is communicated to a multipoint network element configured to exchange data with a plurality of end users in the video session.

The control element can be decrypted and reformatted before being communicated to the multipoint network element. In specific configurations, presence information and contact information can be accessed in order to retrieve information associated with an end user whose image data is to be rendered on at least one of the displays.

Example Embodiments

Figure 1:
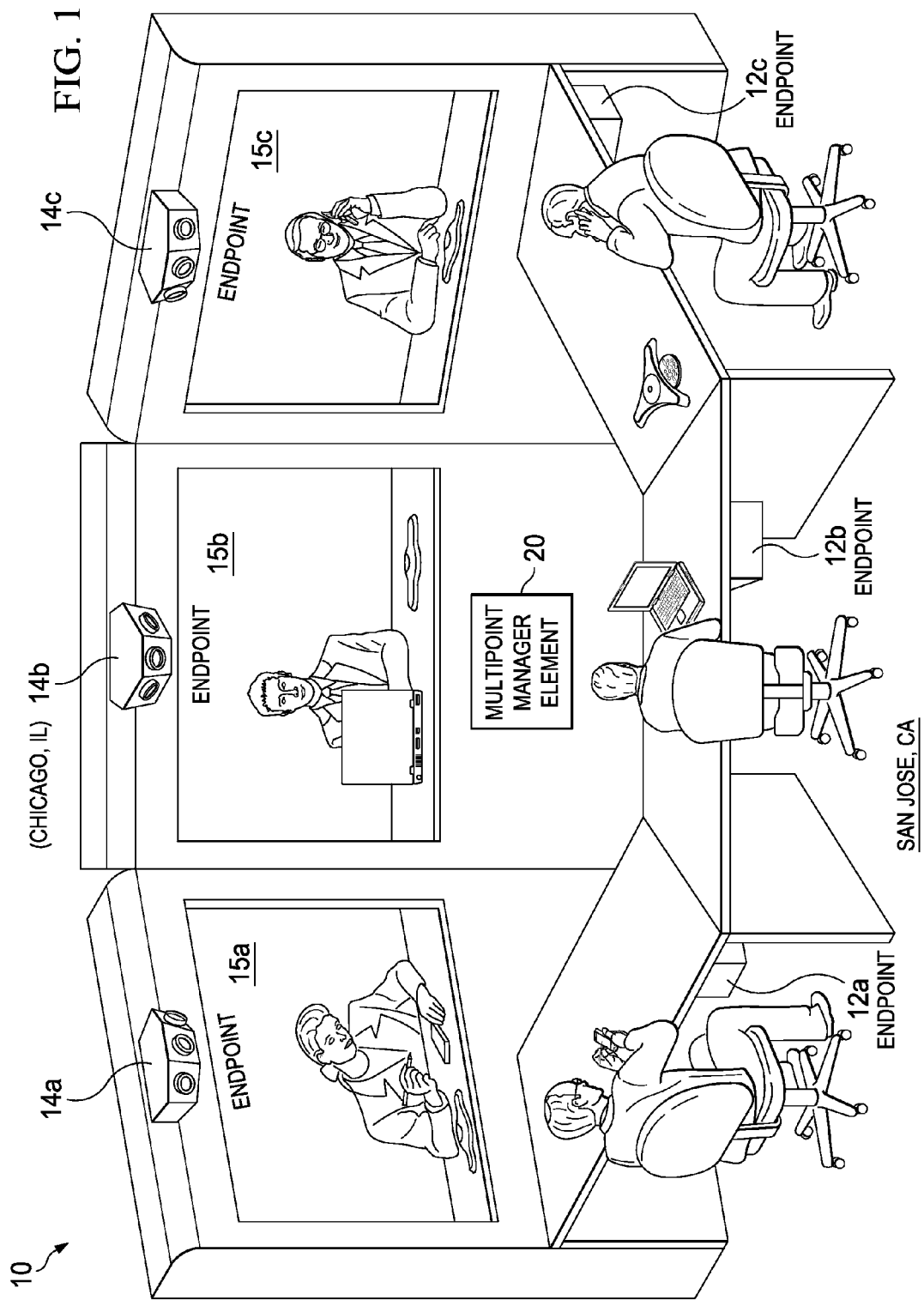
FIG. 1 is a simplified schematic diagram of a communication system for rendering video data in a conferencing environment in accordance with one embodiment.

Turning to FIG. 1, FIG. 1 is a simplified schematic diagram illustrating a communication system 10 for conducting a video conference in accordance with one example embodiment. In a specific implementation, communication system 10 is configured to control which (and how) video data is rendered during the video conference. As used herein in this Specification, the term 'video data' includes presentation elements, image data associated with participants, or any other information or data that may relate to the video conference. FIG. 1 includes multiple endpoints associated with various end users of the video conference. In general, endpoints may be geographically separated, where in this particular example, endpoints 12*a-c* are located in San Jose, Calif. and counterparty endpoints are located in Chicago, Ill. FIG. 1 includes a multipoint manager element 20 coupled to endpoints 12*a-c*. Note that the numerical and letter designations assigned to the endpoints do not connote any type of hierarchy; the designations are arbitrary and have been used for purposes of teaching only. These designations should not be construed in any way to limit their capabilities, functionalities, or applications in the potential environments that may benefit from the features of communication system 10.

In this example, each endpoint is fitted discreetly along a desk and is proximate to its associated participant. Such endpoints could be provided in any other suitable location, as FIG. 1 only offers one of a multitude of possible implementations for the concepts presented herein. In one example implementation, the endpoints are videoconferencing endpoints, which can assist in receiving and communicating video and audio data. Other types of endpoints are certainly within the broad scope of the outlined concept, and some of these example endpoints are further described below. Each endpoint 12*a-c* is configured to interface with a respective multipoint manager element, such as multipoint manager element 20, which helps to coordinate and to process information being transmitted by the end users.

As illustrated in FIG. 1, a number of cameras 14*a*-14*c* and displays 15*a*-15*c* are provided for the conference. Displays 15*a*-15*c* render images to be seen by the end users and, in this particular example, reflect a three-display design (e.g., a 'triple'). Note that as used herein in this specification, the term 'display' is meant to connote any element that is capable of rendering an image during a video conference. This would necessarily be inclusive of any panel, screen, Telepresence display or wall, computer display, plasma element, television, monitor, or any other suitable surface or element that is capable of such rendering.

The components of communication system 10 may use specialized applications and hardware to create a system that can leverage a network. Communication system 10 can use Internet protocol (IP) technology and can run on an integrated voice, video, and data network. The system can also support high quality, real-time voice, and video communications using broadband connections. It can further offer capabilities for ensuring quality of service (QoS), security, reliability, and high availability for high-bandwidth applications such as video. Power and Ethernet connections for all end users can be provided. Participants can use their laptops to access data for the meeting, join a meeting place protocol or a Web session, or stay connected to other applications throughout the meeting.

As a general proposition, the videoconferencing technology of communication system 10 can be configured to create an in-person meeting experience for its participants. To replicate the conference room experience, the architecture is configured to provide a mechanism for intelligently (and autonomously) rendering images (on videoconferencing displays) of certain participants, who exude high levels of participation. Conversely, the system can also identify low levels of involvement of participants and, accordingly, minimize their associated images on the displays. This can better simulate the experience of a conversation that occurs in an actual conference room.

For purposes of illustrating certain example techniques of communication system 10, it is important to understand the communications that may be traversing the network. The following foundational information may be viewed as a basis from which the present disclosure may be properly explained. Typically, when documents are provided during a video conference, the persons who spoke last would continue to be rendered on the display screen. These individuals may be relevant to the document, but this is only arbitrary and not by design. In a worst-case scenario, the person being rendered has no relationship to the documents that are being displayed for the group to view during the video session.

Furthermore, in existing conferencing architectures, display real estate is scarce: meaning that not all of the participants of the video session have their images rendered on a display. Instead, participants are commonly switched on/off displays based on voice activity. In a real-life meeting scenario, when a person (e.g., in a boardroom setting) is ready to present materials for the group, he may stand and gather his team at the front of the room. This physical signaling of which team members are responsible for certain documents is non-existent in current video conferencing architectures.

In accordance with the teachings of the present disclosure, communication system 10 is configured to overcome these shortcomings (and others) in providing a more intelligent solution that links presentation elements to individual participants. Note that as used herein in this Specification, the term 'presentation element' includes documents (e.g., e-mails, Word documents, PDFs, PowerPoint presentations, etc.), graphics, images, media, pictures, slides, any video object, any audio object, or any other appropriate element that could be provided in conjunction with a video conference. Communication system 10 empowers an author (or an administrator) to control which images are being rendered on a given set of displays. In the simplest example, a slide presenter can dictate which participants would be shown by the system during the slide presentation through the placement of control elements. Additionally, the slide presenter can similarly control how, when, and which presentation materials would be rendered on specific displays.

In one particular embodiment, a control element is used as an indicator of how the video conferencing system should render images. For example, a presenter who is authoring slides or media for a given presentation (that occurs in a multipoint videoconferencing environment) can simply add icons, markers, bar codes, syntax, or some other unique indicator (i.e., control elements) to the slides or to the media, where those control elements identify which meeting participants are linked to particular slides or specific media references. Multipoint manager element 20 is configured to use those control elements to switch-in the participants referenced during the presentation. This would allow the participants to be displayed either on-screen (or at least more prominently) at the time that slide is being presented.

Note that such a configuration could offer benefits for a number of scenarios. For example, such a configuration would obviate the need for presenters to simultaneously call out participants, as their associated slide is being rendered during the presentation. In other examples, this could be advantageous when certain individuals have authoritative opinions, or expertise associated with particular subject areas. It is those individuals that the group is interested in watching on the display, as subject matter (which coincides with their expertise) is being discussed during the video session. Advantageously, communication system 10 offers a straightforward mechanism for simply adding control elements to presentation materials in order to achieve better control during the video session. The control data included within (or linked to) the control elements can control switching modes, which video data should be rendered, how images are to be rendered (e.g., across all displays, shown in a middle display of a three-display arrangement, etc.), when video data should be rendered, etc.

Logistically, communication system 10 can embed (i.e., include) any type of control element (e.g., a syntax) into a presentation in order to intelligently reference individuals or materials associated with the video session. Note that there could be an intermediate activity associated with first identifying the control element, and then looking up control data associated with that control element. Alternatively, the control data can be provisioned within the actual control element such that this type of lookup mechanism would be unnecessary. In that instance, the actual control element would trigger certain actions that would occur during the video session. For example, a given control element could signal that a specific, authoritative individual should be rendered on everyone's display. In other instances, the control element could trigger a different type of switching mode (e.g., from voice switching to using the control elements exclusively for switching), or it could trigger which materials would be provided at specific displays (e.g., an important slide being rendered on the main, center display of a three-display configuration). In another example scenario, the two foremost experts of the group who have knowledge about that particular material could straddle the presentation graphic. Thus, for that particular example, the middle display (having the important slide) could be rendered simultaneously with the persons having the most knowledge about that subject area.

Other example arrangements can indicate that the ball should be passed to another participant based on a slide transition. For example, as a given slide appears during the presentation, the control element can be quickly read by the endpoint itself (or read by multipoint manager element 20), which would react to the control element and dictate certain switching activities to be executed. In a general sense, any option or activity that could be toggled or changed in a video conference could be signaled through the control element.

In another example, consider a scenario in which a technology manager is presenting a new electronic product to a group of individuals. Each of the manager's slides can relate to certain aspects of the new product (e.g., the software features, the hardware functions, the targeted market of end users, etc.), where various teams under management would be present for the important video conference. As the manager works through his presentation, and begins launching certain applications that include segmented documentation, the control element can dictate which participants should be rendered on associated displays. The manager could continue to 'narrate' the presentation: permitting each of the associated teams to interject their commentary during the presentation, as their images are properly rendered on corresponding displays.

The control element can be any type of object that can dictate which individuals should be rendered on a display at certain times, based on certain actions or events, etc. The control element could be a simple machine readable object, which simply points to enhanced information about how images should be rendered on the display. In other instances, the control element is a more sophisticated object that includes complex information dictating the activities that should occur during the presentation. In one broad example configuration, the control element simply includes control data, which can reflect any type of information that could influence any type of switching activity, switching mode, video data rendering operation, or command that changes some aspect of an existing video session. In one particular example, each of endpoints is configured to interpret the control element in order to send an appropriate command to its associated multipoint manager element 20. This could include interpreting the control element and providing some type of metadata processing for multipoint manager element 20. Alternatively, this responsibility can be provisioned within multipoint manager element 20. In other examples, this responsibility can be shared amongst the endpoints and their respective multipoint manager element. Any suitable combination or hybrid of these alternatives is clearly within the broad scope of the present disclosure.

Note that there is a set mode in which multipoint manager element 20 would operate. For example, multipoint manager element 20 can be configured to render images associated with the loudest voice in the video session. However, when multipoint manager element 20 identifies (or receives) the control element (e.g., provided in any presentation element), then it can switch modes such that it would then follow the intelligence behind the control element. In a particular embodiment, a given administrator can manually switch modes, or lock modes such that the switching is dictated based on the control elements being seen, or alternatively the administrator can obscure the control elements such that normal (e.g., default) voice switching would be executed during the video session. Furthermore, in certain embodiments, an administrator can readily override any of the control element provisioning using some type of central control mechanism. Additionally, control elements can be preconfigured (e.g., not systematically read by a given endpoint, but preloaded before the presentation elements were offered during the video session). In other examples, the control elements can be dynamically updated, manually updated (e.g., by administrator, by the individual authors themselves, etc.), or adjusted using any appropriate feedback mechanisms.

As an enhancement to the operations of communication system 10, the control element can be used to dictate how certain documentation should be rendered during the video session. For example, if there were one important graphic that deserves the attention of the entire group of participants on the call, then the control element could dictate that all the screens would render that graphic. In other examples, the majority of the displays would include the important graphic, where at least one screen would be reserved for an authoritative individual, who can walk through the graphic with the group.

In other instances involving more complex documentation, the control element can be configured to dictate picture-in-picture imagery such that the complex documentation would be shown more clearly (e.g., or more emphatically), while the individual tasked with explaining the information can be minimized (i.e., via picture-in-picture) in the particular displays. In essence, the control element would dictate any type of command that outlines how the video data is to be displayed during the video session.

In another use case scenario, the control element can be provisioned as a logo. For example, a CEO receiving status reports from different divisions (where each division has its own logo) could readily see the responsible parties for each of the status reports. In operation, multipoint manager element 20 can switch the responsible party onto the screen simultaneously as the slide is being shown to the group involved in the video session. In one particular instance, an administrator (or the control element itself) could declare a particular image as 'sticky': meaning that it will continue to be rendered unless provisioned otherwise. For example, the regional manager of the division could have his image data is labeled as sticky while those status reports are being reviewed: even though other team members may be speaking the entire time the regional manager has his image data displayed.

Before turning to some of the additional operations of communication system 10, a brief discussion is provided about some of the infrastructure of FIG. 1. Endpoints 12a-c may be used by someone wishing to participate in a video conference in communication system 10. The term 'endpoint' may be inclusive of devices used to initiate a communication, such as a switch, a console, a proprietary endpoint, a telephone, a bridge, a computer, a personal digital assistant (PDA), a laptop or electronic notebook, an i-Phone, an iPad, a Google Droid, any other type of smartphone, or any other device, component, element, or object capable of initiating voice, audio, or data exchanges within communication system 10.

Endpoints 12a-c may also be inclusive of a suitable interface to an end user, such as a microphone, a display, or a keyboard or other terminal equipment. Endpoints 12a-c may also include any device that seeks to initiate a communication on behalf of another entity or element, such as a program, a database, or any other component, device, element, or object capable of initiating a voice or a data exchange within communication system 10. Data, as used herein, refers to any type of video, numeric, voice, or script data, or any type of source or object code, or any other suitable information in any appropriate format that may be communicated from one point to another. Additional details relating to endpoints are provided below with reference to FIG. 2.

In operation, multipoint manager element 20 can be configured to establish, or to foster a video session between one or more end users, which may be located in various other sites and locations. Multipoint manager element 20 can also coordinate and process various policies involving endpoints 12a-c. In general, multipoint manager element 20 may communicate with endpoints 12a-c through any standard or proprietary conference control protocol. Multipoint manager element 20 includes a switching component that determines which signals are to be routed to individual endpoints 12a-c. Multipoint manager element 20 can also determine how individual end users are seen by others involved in the video conference based on control elements (which may be found in presentation elements). Furthermore, multipoint manager element 20 can control the timing and coordination of these activities. Multipoint manager element 20 can also include a media layer that can copy information or data, which can be subsequently retransmitted or simply forwarded along to one or more endpoints 12a-c.

Figure 2:
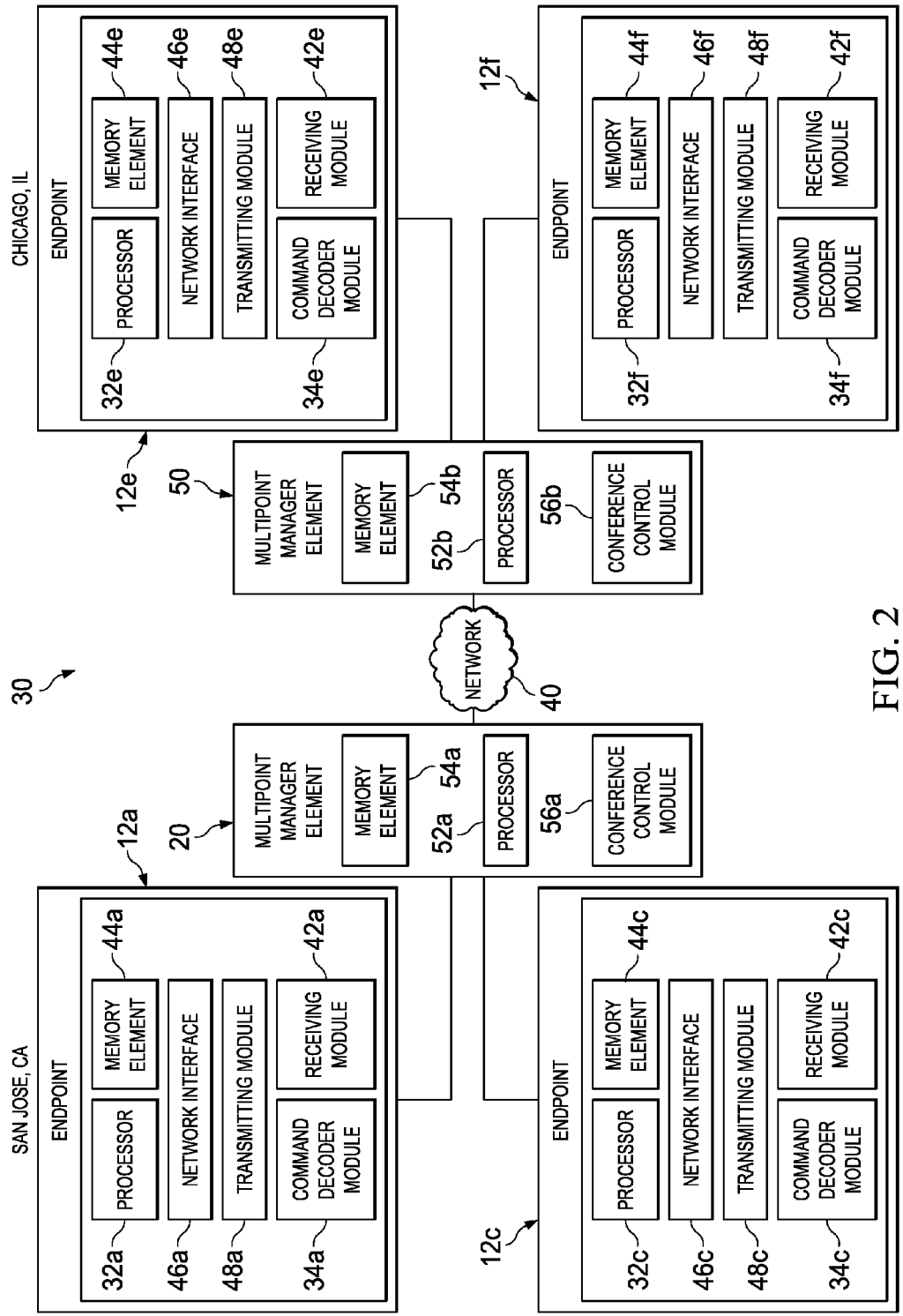
FIG. 2 is a simplified block diagram of a communication system for controlling display use in a conferencing environment in accordance with one embodiment.

Turning to FIG. 2, FIG. 2 is a simplified block diagram illustrating one possible set of details associated with communication system 10. In this example, endpoints 12a and 12c in San Jose are configured to interface with multipoint manager element 20, which is coupled to a network 40. Along similar rationales, a set of endpoints 12e and 12f in Chicago are configured to interface with a counterparty multipoint manager element 50, which is similarly coupled to network 40. In the particular implementation of FIG. 2, endpoints 12a, 12c, 12e, 12f include a respective processor 32a, 32c, 32e, 32f, a respective command decoder module 34a, 34c, 34e, 34f, a respective memory element 44a, 44c, 44e, 44f, a respective network interface 46a, 46c, 46e, 46f, a respective transmitting module 48a, 48c, 48e, 48f, and a respective receiving module 42a, 42c, 42e, 42f. Any one or more of these internal items of the endpoints may be consolidated or eliminated entirely, or varied considerably, where those modifications may be made based on particular communication needs, specific protocols, etc.

Network 40 represents a series of points or nodes of interconnected communication paths for receiving and transmitting packets of information that propagate through communication system 10. Network 40 offers a communicative interface between the endpoints and other network elements (e.g., multipoint manager elements 20, 50), and may be any local area network (LAN), Intranet, extranet, wireless local area network (WLAN), metropolitan area network (MAN), wide area network (WAN), virtual private network (VPN), or any other appropriate architecture or system that facilitates communications in a network environment. Network 40 may implement a UDP/IP connection and use a TCP/IP communication protocol in particular embodiments of the present disclosure. However, network 40 may alternatively implement any other suitable communication protocol for transmitting and receiving data packets within communication system 10. Network 40 may foster any communications involving services, content, video, voice, or data more generally, as it is exchanged between end users and various network elements.

In one example implementation, multipoint manager elements 20, 50 include respective processors 52a-52b, respective memory elements 54a-54b, and respective conference control modules 56a-b, which may dictate the images that are to be rendered on a given display for end users in a video session. Multipoint manager elements 20, 50 can be aware of (and potentially store) information about who is being seen by the end users of the video conference. Multipoint manager elements 20, 50 can selectively distribute signals to various end users using control elements provided in presentation materials.

In one particular instance, multipoint manager elements 20, 50 are configured to exchange data in a network environment such that the intelligent screen management functionality discussed herein is achieved. As used herein in this Specification, the term 'network element' is meant to encompass various types of routers, switches, gateways, bridges, loadbalancers, firewalls, servers, inline service nodes, proxies, processors, modules, or any other suitable device, component, element, or object operable to exchange information in a network environment. The network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

In a specific implementation, multipoint manager elements 20, 50 include software to achieve (or to foster) the screen management operations, as outlined herein in this document. Additionally, endpoints 12a, 12c, 12e, and 12f may include software that similarly achieves (or fosters) the screen management operations described herein. For example, this could include conference control modules 56a-b and/or command decoder modules 34a, 34c, 34e, 34f, which can be configured to execute many of the activities discussed herein with respect to screen management functions. Furthermore, in one example, multipoint manager elements 20, 50 and endpoints 12a, 12c, 12e, and 12f can have an internal structure (e.g., have a processor, a memory element, etc.) to facilitate some of the operations described herein. In other embodiments, all of these screen management features may be provided externally to these elements or included in some other network element to achieve this intended functionality. Alternatively, any other network element can include this software (or reciprocating software) that can coordinate with multipoint manager elements 20, 50 and endpoints 12a, 12c, 12e, and 12f in order to achieve the operations, as outlined herein.

Note that in certain example implementations, the screen management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Hence, any of the devices illustrated in the preceding FIGURES may include a processor that can execute software or an algorithm to perform the screen management activities, as discussed in this Specification. Furthermore, multipoint manager elements 20, 50 can include memory elements for storing information to be used in achieving the intelligent screen management operations, as outlined herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.'

In operation, and with reference to endpoint 12a, command decoder module 34a may be used to decode control elements in a document, such as a slide presentation. In general, the control elements include control data such as a command, an object, metadata, etc. that provide direction over the presentation of data and participants. This includes identifying certain participants that should be displayed on a screen during a slide, controlling the layout of a slide on the screen, etc. For example, in a multiscreen environment, a control element may include control data that dictates that a slide should be stretched across multiple displays, or that multiple displays should be used to render image data associated with a particular participant. In another example, the number of participants may exceed the number of available screens, and a control element may include a command to display a particular participant, or to change switching modes. The underlying commands may be formatted using a standard markup language, such as extensible markup language (XML), hypertext markup language (HTML), or any other suitable protocol scheme.

Figure 3:
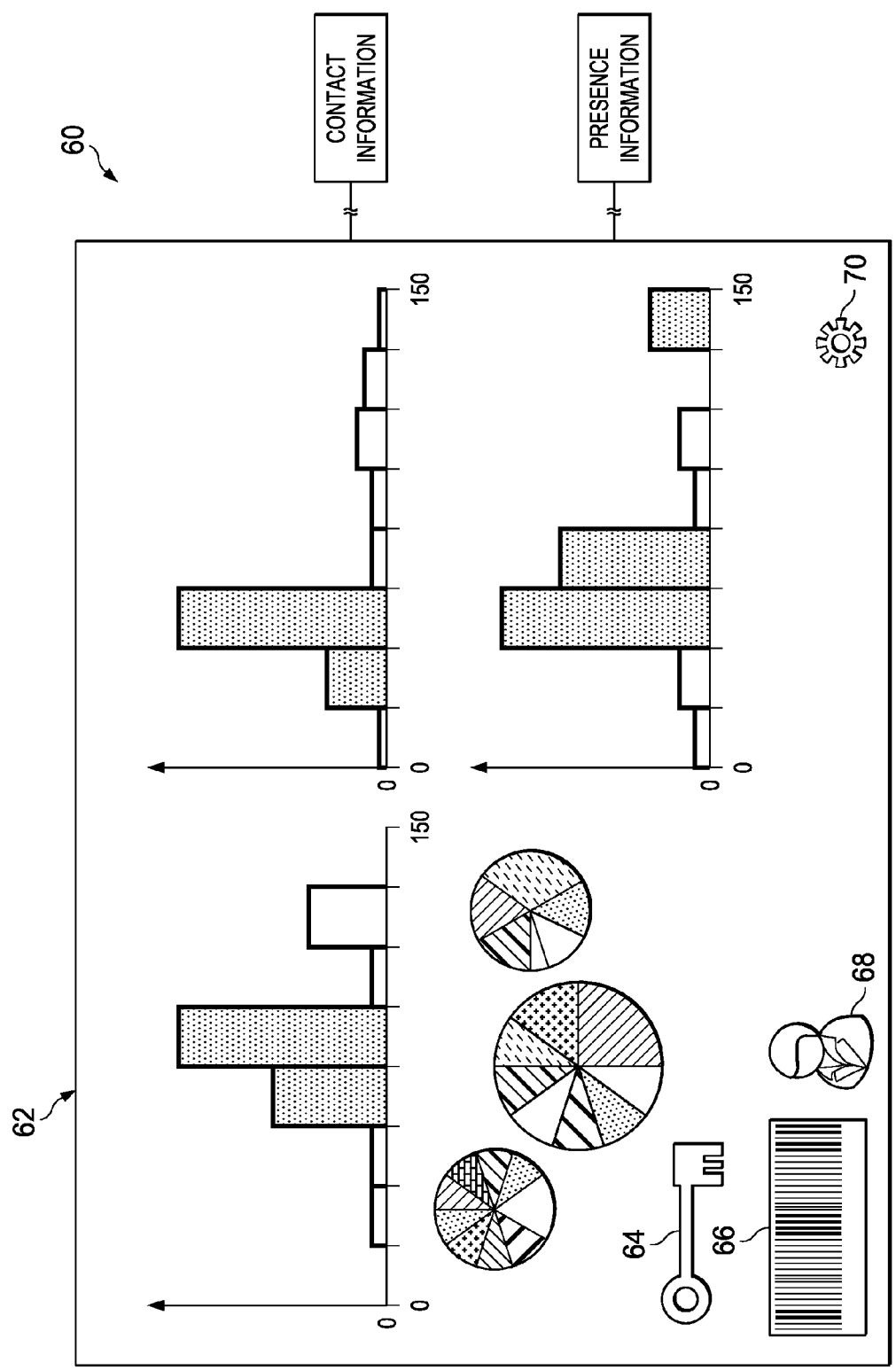
FIG. 3 is a simplified diagram of an example display in accordance with one embodiment.

FIG. 3 is a simplified diagram illustrating a screen 60 and a slide 62, which collectively can be used to demonstrate certain features of communication system 10. Slide 62 may display presentation materials such as charts and graphs, as well as one or more control elements, which are provided at the bottom of slide 62. Control elements may be represented by various icons in the slide, such as a key icon 64, a bar code 66, a person icon 68, a widget icon 70, etc. Note that such examples are not exhaustive and, further, merely represent some of the many control elements that may be used to dictate commands associated with managing (e.g., inclusive of switching, changing, optimizing etc.) video data on one or more displays. Operationally, these control elements provide a visual cue to presenters and to other participants about upcoming switching activities. However, it is imperative to note that such control elements can be hidden (or simply not seen by the naked eye) such that the switching activities can still occur without visually cueing the participants of the video session. Hence, any suitable control element can be included in a given presentation element in order to influence videoconferencing activities. A given endpoint, or a multipoint manager element can evaluate (i.e., read, identify, detect, monitor, access, or otherwise process) a presentation element in order to determine which actions should occur during the video session.

In one particular instance, contact information and presence information can be used in conjunction with the activities of communication system 10. For example, if the given control element signaled that Joe Smith should be rendered, additional information can be gleaned from the stored contact information (e.g., accessed through an e-mail platform such as Microsoft Outlook, accessed through a directory, accessed through a PDA, a smartphone, an iPad, etc.). Similarly, presence information can be readily gleaned through any appropriate mechanism (e.g., e-mail platforms, instant messaging platforms, or any other suitable platform in which presence information can be accessed). Consider an example in which a given control element includes control data that signals that an authoritative figure (John Adams) should be presented in conjunction with a given PowerPoint slide. If his presence information dictated that he is simply unavailable at this time, a second participant could be used in his place (e.g., his immediate in command), or the second most authoritative figure in the group could be used in his place, or the presentation can be vectored back to the administrator, etc. Any such mechanisms are readily accommodated by the broad teachings of communication system 10.

Figure 4:
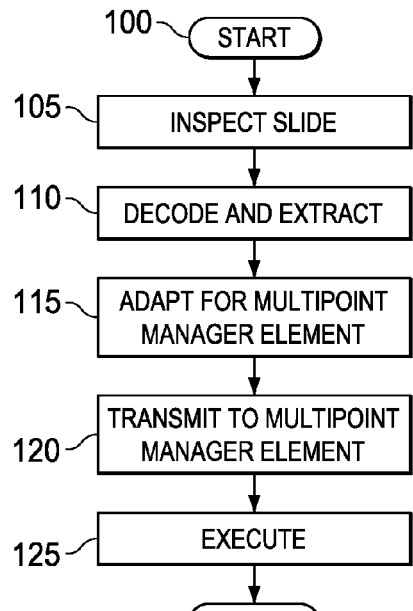
FIG. 4 is a simplified flowchart illustrating example operations associated with one embodiment of the communication system.

FIG. 4 is a simplified block diagram illustrating one potential operation associated with an embodiment of communication system 10. A slide presentation is started at 100, which may be triggered by uploading the presentation to an endpoint, or by receiving instructions to display a document, for example. Each slide is inspected at 105, where such inspection activities may be executed by a command decoder module, for example. In one particular instance, such intelligence is resident in a given endpoint; however, each multipoint manager element 20, 50 could also be provisioned with the requisite intelligence to evaluate a given slide in order to detect the presence of a control element.

If a slide includes an embedded control element, the control element is decoded, if necessary, at 110 to extract control data (e.g., a command). For example, if the control element is compressed, it may be uncompressed, or if the control element is in some type of encrypted protocol (or is in some unreadable/inconsistent format) the control element would be decrypted, reformatted, or otherwise processed in order to evaluate a command activity. At 115, the command is translated or otherwise adapted into a format suitable for a multipoint manager element. For example, if the command in the control element is coded using XML, the command may be translated and packaged for transmission using a compatible conference control protocol. The command (i.e., or at least a portion of the control data) may then be communicated to a multipoint manager element at 120. The multipoint manager element may then execute the command at 125. In a simplistic example, the command could dictate that at the start of the presentation, the leader of the group should be rendered on everyone's screen: regardless of whether or not he is the active speaker.

Figure 5:
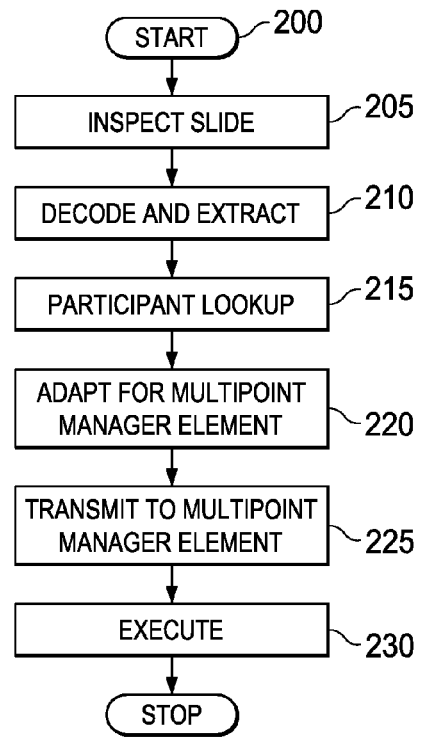
FIG. 5 is a simplified flowchart illustrating example operations associated with an embodiment of the communication system.

Turning to FIG. 5, FIG. 5 is a simplified block diagram illustrating a more detailed example of a potential operation associated with an embodiment of communication system 10. In this example, a presentation is started at 200. Each slide in the presentation may be inspected to detect the presence of control elements at 205. If a slide includes an embedded control element, it may be decoded, if necessary, to extract a command at 210. In one embodiment, the command identifies a particular participant that should be displayed on a display during the slide. The participant may be identified in a variety of ways such as by association with a particular location or endpoint, or by a database or an address book lookup at 215. This can include contact data and/or presence data, as identified previously. All such information may be stored in an endpoint, in a multipoint manager element, or in any other suitable memory element (e.g., a database, a table, a key, cache, a repository, etc.). At 220, the command can be translated into a format suitable for a multipoint manager. The command is subsequently communicated to a multipoint manager element at 225. The multipoint manager element may then execute the command at 230. In this particular instance, the command causes image data associated with the identified participant to be rendered during the video conference so that he is prominently displayed on a particular display without having to speak first.

Figure 6:
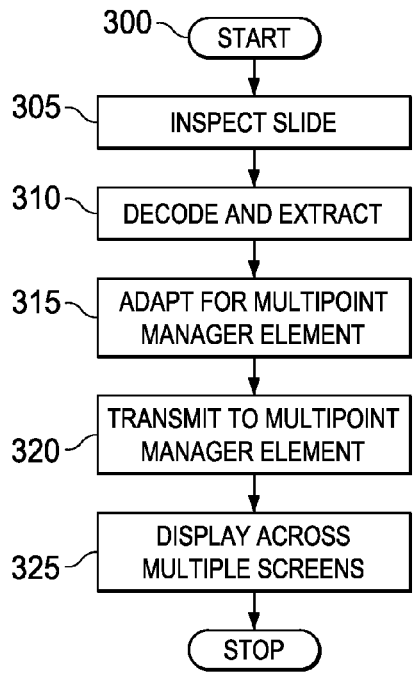
FIG. 6 is a simplified flowchart illustrating example operations associated with an embodiment of the communication system.

FIG. 6 is a simplified block diagram illustrating another more detailed example of a potential operation associated with an embodiment of communication system 10. In this example, a presentation is started at 300, where again each slide in the presentation may be inspected to detect the presence of control elements at 305. If a slide includes a control element, it may be decoded, if necessary, to identify control data (e.g., extract a command) at 310. In one embodiment, the control data includes instructions for displaying a slide on a video display during a video session. At 315, the command is translated into a format suitable for a multipoint manager to understand. The command is then transmitted to a multipoint manager element at 320. The multipoint manager element may then execute the command at 325, causing the slide to be displayed, for example, across all available screens.

In yet other embodiments, any combination of control elements may be embedded in a slide. For example, a slide may include one control element that identifies a participant and another control element that suggests placement of the slide such that the participant is placed on the left screen, and the slide is stretched across the middle and right screens.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a particular module, such as a command decoder module, is provided within a network element, these modules can be provided externally, or consolidated and/or combined in any suitable fashion. In certain instances, such modules may be provided in a single proprietary unit.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    establishing a video session in which a plurality of displays are used for rendering video data;
    evaluating a presentation element to identify a control element that includes control data, wherein the control element is included in the presentation element, and the presentation element is a selected one of a group of presentation elements, the group consisting of: a word processor document, a PDF document, a slide presentation, and an e-mail; and
    communicating at least a portion of the control data such that the portion of the control data can be used to determine which video data is to be rendered on the plurality of displays.

2. The method of claim 1, wherein the control data provides a switching command that relates to rendering particular image data on a particular one of the displays.

3. The method of claim 1, wherein the control element provides a change in a switching mode such that subsequent control elements included in the presentation element control which of the video data is to be rendered on the displays.

4. The method of claim 1, wherein the control element is communicated to a multipoint network element configured to exchange data in the video session.

5. The method of claim 4, wherein the control element is decrypted and reformatted before being communicated to the multipoint network element.

6. The method of claim 1, wherein contact information is accessed to retrieve information associated with image data to be rendered on at least one of the displays.

7. The method of claim 1, wherein the word processor document is a Word document;
    the slide presentation is a PowerPoint document; and
    the method further comprises:
        identifying a control element including control data by evaluating one of a group consisting of:
        a media object;
        a video object;
        an audio object; and
        a graphic.

8. Logic encoded in non-transitory media that includes code for execution and, when executed by a processor, operable to perform operations comprising:
    establishing a video session in which a plurality of displays are used for rendering video data;
    evaluating a presentation element to identify a control element that includes control data, wherein the control element is included in the presentation element, and the presentation element is a selected one of a group of presentation elements, the group consisting of: a word processor document, a PDF document, a slide presentation, and an e-mail; and
    communicating at least a portion of the control data such that the portion of the control data can be used to determine which video data is to be rendered on the plurality of displays.

9. The logic of claim 8, wherein the control data provides a switching command that relates to rendering particular image data on a particular one of the displays.

10. The logic of claim 8, wherein contact information is accessed to retrieve information associated with image data that is to be rendered on at least one of the displays.

11. The logic of claim 8, wherein the control element provides a change in a switching mode such that subsequent control elements included in the presentation element control which of the video data is to be rendered on the displays.

12. The logic of claim 8, wherein the control element is communicated to a multipoint network element configured to exchange data in the video session.

13. The logic of claim 12, wherein the control element is decrypted and reformatted before being communicated to the multipoint network element.

14. An apparatus, comprising:
a memory element configured to store data;
a command decoder module; and
a processor operable to execute instructions associated with the data, wherein the processor, the command decoder module, and the memory element cooperate to:
establish a video session in which a plurality of displays are used for rendering video data;
evaluate a presentation element to identify a control element that includes control data, wherein the control element is included in the presentation element, and the presentation element is a selected one of a group of presentation elements, the group consisting of: a word processor document, a PDF document, a slide presentation, and an e-mail; and
communicate at least a portion of the control data such that the portion of the control data can be used to determine which video data is to be rendered on the plurality of displays.

15. The apparatus of claim 14, wherein the control data provides a switching command that relates to rendering particular image data on a particular one of the displays.

16. The apparatus of claim 14, wherein the control element provides a change in a switching mode such that subsequent control elements included in the presentation element control which of the video data is to be rendered on the displays.

17. The apparatus of claim 14, wherein the control element is communicated to a multipoint network element configured to exchange data in the video session.

18. The apparatus of claim 17, wherein the control element is decrypted and reformatted before being communicated to the multipoint network element.

19. The apparatus of claim 14, wherein contact information is accessed to retrieve information associated with image data to be rendered on at least one of the displays.

20. The apparatus of claim 14, wherein the word processor document is a Word document;
the slide presentation is a PowerPoint document; and
the processor is configured to identify a control element including control data by evaluating one of a group consisting of:
a media object;
a video object;
an audio object; and
a graphic.

* * * * *